(12) United States Patent
Rosenqvist (10) Patent No.: US 11,454,404 B2
(45) Date of Patent: Sep. 27, 2022

(54) ENERGY DISTRIBUTING SYSTEM (71) Applicant: E.ON Sverige AB, Malmö (SE)

(72) Inventor: Fredrik Rosenqvist, Helsingborg (SE)

(73) Assignee: E.ON SVERIGE AB, Malmo (SE)

( * ) Notice: Subject to any disclaimer, the term of this patent is extended or adjusted under 35 U.S.C. 154(b) by 639 days.

(21) Appl. No.: 16/332,371

(22) PCT Filed: Sep. 14, 2017

(86) PCT No.: PCT/EP2017/073151
§ 371 (c)(1),
(2) Date: Mar. 12, 2019

(87) PCT Pub. No.: WO2018/054757
PCT Pub. Date: Mar. 29, 2018

(65) Prior Publication Data
US 2021/0293417 A1 Sep. 23, 2021

(30) Foreign Application Priority Data
Sep. 20, 2016 (EP) ................................. 16189586

(51) Int. Cl.
*F24D 10/00* (2022.01)
*F24D 19/10* (2006.01)

(52) U.S. Cl.
CPC ....... *F24D 10/006* (2013.01); *F24D 19/1006* (2013.01); *F24D 19/1072* (2013.01);
(Continued)

(58) Field of Classification Search
CPC .. F24D 10/006; F24D 10/003; F24D 19/1072; F24D 19/1006; F24D 2200/13;
(Continued)

(56) References Cited

U.S. PATENT DOCUMENTS 3,838,813 A * 10/1974 Brosenius ............. F24D 10/006
 237/13
2011/0011558 A1* 1/2011 Dorrian .................. F16L 9/133
 165/45
(Continued)

FOREIGN PATENT DOCUMENTS

| DE | 3123875 A1 | 3/1982 |
| GB | 2522025 A | 7/2015 |
| WO | 2010/102626 A2 | 9/2010 |

OTHER PUBLICATIONS

Heat Transfer Analysis of Underground Heat and Chilled-Water Distribution Systems, US Dept. of Commerce, NBS, NBSIR 81-2378, pp. 13-26, Nov. 1981 (Year: 1981).*
(Continued)

*Primary Examiner* — Steven S Anderson, II
*Assistant Examiner* — Phillip Decker
(74) *Attorney, Agent, or Firm* — Xsensus LLP (57) ABSTRACT

A local energy distributing system includes a local feed conduit; a local return conduit; a central heat exchanger connected to a heating grid having a feed conduit for an incoming flow of heat transfer fluid having a first temperature in the range of 50-120° C., and a return conduit for a return flow of heat transfer fluid having a second temperature, the second temperature being lower than the first temperature, wherein the central heat exchanger is configured to exchange heat from the incoming flow of heat transfer fluid to an outgoing flow of local heat transfer fluid in the local feed conduit. The system also includes a plurality of local heating systems, each having an inlet connected to the local feed conduit and an outlet connected to the local return conduit, wherein each local heating system is configured to provide hot water and/or comfort heating to a building.

20 Claims, 4 Drawing Sheets

(52) U.S. Cl.
CPC ...... *F24D 2200/12* (2013.01); *F24D 2200/13* (2013.01); *F24D 2220/06* (2013.01); *Y02B 30/17* (2018.05)

(58) Field of Classification Search
CPC .. F24D 2200/12; F24D 2220/06; Y02B 30/17
See application file for complete search history.

(56) References Cited

U.S. PATENT DOCUMENTS

2012/0279681 A1* 11/2012 Vaughan ................ F24D 10/00
165/62
2016/0334116 A1* 11/2016 Zaynulin ............... F24D 10/006

OTHER PUBLICATIONS

International Search Report dated Nov. 28, 2017 for PCT/EP2017/073151 filed on Sep. 14, 2017, 10 pages.

* cited by examiner

ENERGY DISTRIBUTING SYSTEM

CROSS-REFERENCE TO RELATED APPLICATIONS

The present application is based on PCT filing PCT/EP2017/073151, filed Sep. 14, 2017, which claims priority to EP 16189586.7, filed Sep. 20, 2016, the entire contents of which are incorporated herein by reference.

FIELD OF THE INVENTION

The invention relates to an energy distributing system.

BACKGROUND OF THE INVENTION

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort cooling and/or process cooling.

A common grid for providing heating is a gas grid or an electrical grid providing comfort and/or process heating, and/or hot tap water preparation. An alternative grid for providing heating is a district heating grid. The district heating grid is used for providing heated heat transfer fluid, typically in the form of water, to buildings of the city. A centrally placed heating and pumping plant is used for heating and distributing the heated heat transfer fluid. The heated heat transfer fluid is delivered to the buildings via one or more feed conduits and is returned to the heating and pumping plant via one or more return conduits. Locally at a building, heat from the heated heat transfer fluid is extracted via a district heating substation comprising a heat exchanger.

A common grid for providing cooling is the electrical grid. The electricity may e.g. be used for running refrigerators or freezers or for running air conditioners for providing comfort cooling. An alternative grid for providing cooling is a district cooling grid. The district cooling grid is used for providing cooled heat transfer fluid, typically in the form of water, to buildings of the city. A centrally placed cooling and pumping plant is used for cooling and distributing the thus cooled heat transfer fluid. The cooled heat transfer fluid is delivered to the buildings via one or more feed conduits and is returned to the cooling and pumping plant via one or more return conduits. Locally at a building, cold from the cooled heat transfer fluid is extracted via a heat pump.

The use of energy for heating and/or cooling is steadily increasing, influencing the environment negatively. By improving utilization of the energy distributed in the energy distribution grids, negative influences on the environment may be reduced. Hence, there is a need for improving utilization of the energy distributed in energy distribution grids, including existing grids. Provision of heating/cooling also requires huge investments when it comes to engineering projects and there is a constant strive to cut the costs. Hence, there is a need for improvements in how to provide sustainable solutions to heating and cooling of a city.

SUMMARY OF THE INVENTION

It is an object of the present invention to solve at least some of the problems mentioned above.

According to a first aspect a local energy distributing system is provided. The local energy distributing system comprises: a local feed conduit; a local return conduit; a central heat exchanger connected to a district heating grid having a district feed conduit for an incoming flow of district heat transfer fluid having a first temperature in the range of 50-120° C., and a district return conduit for a return flow of district heat transfer fluid, wherein the central heat exchanger is configured to exchange heat from the incoming flow of district heat transfer fluid to an outgoing flow of local heat transfer fluid in the local feed conduit, the outgoing flow of local heat transfer fluid having a temperature of 5-30° C.; and a plurality of local heating systems, each having an inlet connected to the local feed conduit and an outlet connected to the local return conduit, wherein each local heating system is configured to provide hot water and/or comfort heating to a building.

By exchanging heat from the incoming flow of district heat transfer fluid to the outgoing flow of local heat transfer fluid in accordance with the above, a cheaper, less advanced and more energy efficient energy distributing system as compared with a traditional district heating system utilizing a district heating grid is achieved. For example, heat transfer losses will be reduced making the local energy distributing system more economical and energy efficient. Moreover, since heat transfer losses will be reduced, due to the relatively low temperature of the local heat transfer fluid distributing the energy in the local energy distribution system, constraints on the use of piping's for the conduits transporting the heat transfer fluid is reduced as compared with a traditional district heating system utilizing a district heating grid. Moreover, by setting the from the central heat exchanger outgoing flow of local heat transfer fluid at the temperature of 5-30° C. the cooling rate in the local energy distribution system will be reduced as compared with a traditional district heating system utilizing a district heating grid. The local energy distributing system also makes it possible to implement efficient energy distribution solutions in expansion areas where existing district heating grids are weak or difficult to expand. Strengthen or expanding existing district heating grids is both expensive and complicated. Moreover, by reducing the cooling rate of the energy distribution system the flow rate of the heat transfer fluid is reduced. Hence, the overall demand on the pumping in the energy distribution system is reduced. This will further reduce the complexity of the energy distribution system as compared with a traditional district heating system utilizing a district heating grid.

According to theoretical simulations, the a local energy distributing system will over a calendar year absorb approximately 5-10%, of the total energy being put in to the local energy distributing system, from solar energy, in the form of thermal energy absorbed from the ground surrounding the local feed and return conduits. Further, 65-70% of the total energy being put in to the local energy distributing system will originate from energy provided by the district heating grid and approximately 25% of the total energy being put in to the local energy distributing system will be electricity power used for driving the local heating systems.

Each of the plurality of local heating systems may be configured to extract heat from local heat transfer fluid entering the local heating system via the inlet and return local heat transfer fluid to the local return conduit via the outlet.

Each of the plurality of local heating systems may be configured to return local heat transfer fluid having a temperature being in the range of −5-15° C. By conducting local heat transfer fluid having a temperature in this temperature range, heat loss to the surroundings may be reduced. Moreover, thermal energy of the surroundings may even be absorbed by the local heat transfer fluid flowing in the local return conduit. The surroundings of the return conduit is typically ground since the return and feed conduits typically is arranged in the ground along the majority of their paths.

The local feed conduit together with the local return conduit may have a heat transfer coefficient greater than 2.5 Watt per meter&Kelvin, W/(mK), when parallel arranged in ground. This value of the heat transfer coefficient is estimated when the local feed and return conduits are parallel arranged within a distance of one meter from each other in ground having an average annual temperature of 8° C. and the arithmetic average temperature of the local feed and return conduits are 8-10° C. By this, thermal heat from the surroundings may be picked up by the local feed conduit and/or the local return conduit. Moreover, cheap un-insulated plastic pipes may be used for the local feed conduit and/or the local return conduit. Moreover, thermal energy of the surroundings may easily be absorbed by the local heat transfer fluid flowing in the local return conduit.

At least some of the plurality of local heating systems may comprises a local circulation pump connected between the inlet and the outlet of the respective local heating system for circulating local heat transfer fluid in the local feed and return conduits. A system with distribute pumping of the local heat transfer fluid are thus provided. Such a system is less vulnerable. This since upon failure in one or more of the local circulation pumps the rest of the system will still be operational. Moreover, by distributing the pumping over the plurality of local circulation pumps smaller and cheaper circulation pumps may be utilized.

The local energy distributing system may further comprise a central circulation pump configured to circulate the fluid in the local feed and return conduits. The central circulation pump may be used to provide a base pressure in the local energy distribution system; this will reduce the pumping work of the local circulation pumps. Alternatively, or in combination, by using the central circulation pump the installation in some or all of the buildings may be simplified since the central circulation pump may be used instead of local circulation pumps. Instead of local circulation pumps in the buildings check valves may be used for regulating the flow within the local heating system(s).

Each local heating system may comprise a heat emitter and a local heat pump.

The central heat exchanger may be configured to exchange heat such that the district heat transfer fluid returned to the district return conduit is having a temperature of 5-20° C., preferably 5-10° C. By returning district heat transfer fluid of this low temperature the cooling performed in the central heat exchanger 21 can be as great as approx 100° C. (depending of the temperature of the incoming district heat transfer fluid feed through the district feed conduit). This high degree of cooling performed in the central heat exchanger will reduce the heat losses in the district heating grid. Moreover, it will reduce the degree of pumping needed in the district heating grid.

The local energy distributing system may further comprise one or more local cooling systems having an inlet connected to the outlet of one of the plurality of local heating systems, wherein the one or more local cooling systems are configured to extract heat from a building. By this a combined heating and cooling system is provided. Moreover, comfort heating and comfort cooling is provided at the same time in a simple and cost effective manner using only one of energy distribution grid.

The one or more local cooling systems may comprise a cooler and a cooling heat exchanger.

According to a second aspect an energy distributing system is provided. The energy distributing system comprises: a district heating grid having a district feed conduit for an incoming flow of district heat transfer fluid having a first temperature in the range of 50-120° C., and a district return conduit for a return flow of district heat transfer fluid; and a local energy distributing system according to the above.

The energy distributing system may further comprise a central heat production plant connected to the district heating grid for providing heat to the district heating grid.

The energy distributing system may further comprise a plurality of district heating substations, wherein each district heating substation is configured to provide hot tap water and/or comfort heating to a building.

The above mentioned features of the local energy distribution system, when applicable, apply to this second aspect as well. In order to avoid undue repetition, reference is made to the above.

According to a third aspect method for distributing energy to a plurality of buildings is provided. The method comprises: exchanging, at a central heat exchanger, heat from an incoming flow of district heat transfer fluid of a district feed conduit in a district heating grid, the incoming flow of district heat transfer fluid having a first temperature in the range of 50-120° C., to an outgoing flow of local heat transfer fluid in a local feed conduit of a local energy distributing system, the outgoing flow of local heat transfer fluid having a temperature of 5-30° C.; and extracting, at a local heating system in each of the plurality of buildings, each local heating system having an inlet connected to the local feed conduit, heat from the local heat transfer fluid flowing in the local feed conduit for providing hot tap water and/or comfort heating to the respective building.

The method may further comprise circulating a flow of local heat transfer fluid in the local energy distributing system, the local energy distributing system comprising the local feed conduit configured to distribute local heat transfer fluid from the central heat exchanger and a local return conduit configured to distribute local heat transfer fluid to the central heat exchanger.

The method may further comprise: extracting, at a cooling system, heat from a building of the plurality of buildings, the local cooling system having an inlet connected to the outlet of one of the plurality of local heating systems; and distributing the from the building extracted heat to the local heat transfer fluid.

The above mentioned features of the local energy distribution system and/or the energy distribution system, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

In connection with FIG. 1 an energy distribution system 1 will be discussed. The energy distribution system 1 comprises a district heating grid 10 and a local energy distributing system 20. The local energy distributing system 20 is connected to the district heating grid 10 via a central heat exchanger 21.

The district heating grid 10 is formed by one or several hydraulic networks configured to deliver district heat transfer fluid to district heating substations 16 which are arranged in buildings 40 such as office buildings, business premises, residential homes and factories in need for heating. A typically district heating substation 16 comprises a heat exchanger. A typical district heating grid 10 comprises a central heat production plant 15 which heats the district heat transfer fluid. The central heat production plant 15 may by way of example be a district heating plant. The heated district heat transfer fluid is transported via one or more district feed conduits 11 forming part of a conduit net work to distributed district heating substations 16 which are arranged in the buildings 40. It goes without saying that one and the same building 40 may comprise several district heating substations 16. The district heating substations 16 are configured to provide comfort heating and/or hot tap water to the respective building 40.

When the heat of the district heat transfer fluid is consumed in the district heating substations 16 the temperature of the district heat transfer fluid is lowered and the thus cooled district heat transfer fluid is returned to the central heat production plant 15 via one or more district return conduits 12 forming part of the conduit net work.

District heating grids 1 are used to satisfy comfort heating demands and/or hot tap water demands. The district heat transfer fluid is typically water. The temperature of the district heat transfer fluid in the one or more district feed conduits 11 is typically between 50-120° C. The return temperature in the one or more district return conduits 12 is typically between 40-60° C.

The driving pressure difference between district feed conduits 11 and district return conduits 12 of the hydraulic network always creates a so called "pressure cone" whereby the pressure in the district feed conduits 11 is higher than the pressure in the return conduits 12. This pressure difference circulates the district heat transfer fluid in the hydraulic network between the central heat production plant 15 and the district heating substations 16. One or more district grid circulation pumps 13 are arranged in the district heating grid 10 in order to provide the driving pressure difference.

The district feed conduits 11 and the return conduits 12 used in the district cooling grid 10 are typically made of insulated steel pipes designed for a maximum pressure of 1,6 MPa and maximum temperature of about 100-120° C. In this context insulated shall be construed such that the pipes have an extra layer of heat insulating material wrapped around the same. As a non-limiting example, the steel pipes of the district feed conduits 11 and the return conduits 12 are insulated such that the conduits arranged in parallel in ground have a heat transfer coefficient lower than 1.5 Watt per meter&Kelvin, W/(mK), preferably lower than 1.0 W/(mK). These value of the heat transfer coefficient is estimated when the district feed and return conduits are parallel arranged within a distance of one meter from each other in ground having an average annual temperature of 8° C. and the arithmetic average temperature of the district feed and return conduits of 80-90° C.

As indicated above, the local energy distributing system 20 is connected to the district heating grid 10 via the central heat exchanger 21. Heat exchangers as such are well known in the art and can basically be described as comprising an arrangement of a first circuit circulating a first fluid having a first temperature, and a second circuit circulating a second fluid having a second temperature. The first and second circuits closely abut each other along a respective extension thereof. By the two circuits along an extension closely abutting each other a heat transfer takes place between the first and second fluids. For the central heat exchanger 21 the first circuit forms part of the district heating grid 10 and the second circuit forms part of a local energy distributing grid 20a. The local energy distributing grid 20a being part of the local energy distributing system 20. The local energy distributing grid 20a comprising a local feed conduit 22 and a local return conduit 23. The local energy distributing grid 20a is configured to deliver local heat transfer fluid to local heating systems 200 which are arranged in buildings 40, preferably residential homes but also other types of buildings 40 such as office buildings, business premises and factories in need for heating.

The central heat exchanger 21 is configured to exchange heat from an, via the district feed circuit 11, incoming flow of district heat transfer fluid to an outgoing flow of local heat transfer fluid in the local feed conduit 22. The central heat exchanger 21 is configured to exchange heat such that the outgoing flow of local heat transfer fluid has a temperature of 5-30° C. Further, the central heat exchanger 21 may be configured to exchange heat such that the district heat transfer fluid returned to the return conduit is having a temperature of 5-10° C. By returning district heat transfer fluid of this low temperature the cooling performed in the central heat exchanger 21 can be as great as approx 100° C. (depending of the temperature of the incoming district heat transfer fluid feed through the district feed conduit). This high degree of cooling performed in the central heat exchanger will reduce the heat losses in the district heating grid. Moreover, it will reduce the degree of pumping needed in the district heating grid.

Figure 2:
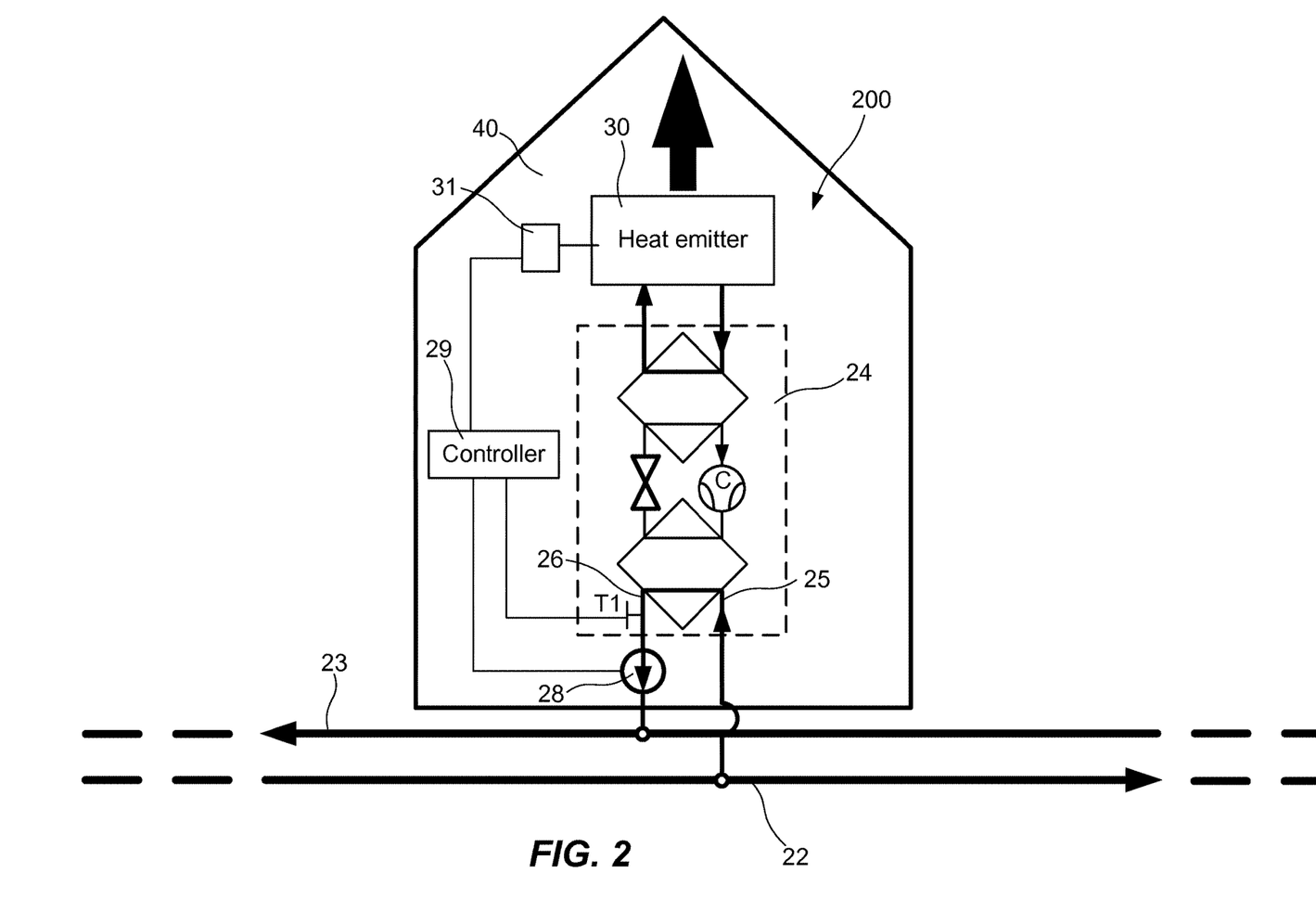
FIG. 2 is a schematic diagram of a local heating system.

Hence, the local energy distributing system 20 comprises a plurality of local heating systems 200. With reference to FIG. 2 a local heating system 200 will be discussed in more detail.

The local heating system 200 comprises a heat pump 24 and a heat emitter 30. The heat emitter 30 is connected to the local energy distributing grid 20a via the heat pump 24. The local heating system 200 is configured to, via the heat emitter 30 and the local heat pump 24, provide hot tap water and/or comfort heating to a respective building 40. The local heat pump 24 has an inlet 25 connected to the local feed conduit 22 and an outlet 26 connected to the local return conduit 23. In this context the term "inlet of the heat pump" is to be interpreted as the inlet via which the heat pump is fed with local heat transfer fluid from the local energy distributing grid 20a. Likewise, the term "outlet of the heat pump" is to be interpreted as the outlet via which the heat pump returns local heat transfer fluid to the local energy distributing grid 20a.

Heat pumps as such, are well known in the art and basically comprise a closed circuit in which brine is circulated between a first heat exchanger and a second heat exchanger. The first heat exchanger has an inlet and an outlet, in this case the inlet 25 and the outlet 26 of the local heat pump 24, via which the local heat pump 24 is connected to a first circuit circulating a flow of a first fluid, in this case the local heat transfer fluid of the local energy distributing grid 20a. Likewise, the second heat exchanger has an inlet and an outlet via which the local heat pump 24 is connected to a second circuit circulating a flow of a second fluid, in this case a heating fluid of the heat emitter 30. The heating fluid of the heat emitter 30 is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

Since the flow of local heat transfer fluid in the local feed conduit is having a temperature of 5-30° C. the input temperature to the local heat pump 24 is in the same temperature range. The local heating system 200 is configured to extract heat from local heat transfer fluid entering the local heat pump 24 via the inlet 25 and return local heat transfer fluid to the local return conduit 23 via the outlet 26. The local heating system 200 is configured to return local heat transfer fluid having a temperature being in the range of −5-15° C.

The local heating system 200 may further comprises a local circulation pump 28. In the in FIG. 2 shown embodiment the local circulation pump 28 is arranged in the outlet 26 of the local heat pump 24. However, the local circulation pump 28 may alternatively be arranged in the inlet 25 of the local heat pump 24. Hence, the local circulation pump 28 is connected between the inlet 25 and the outlet 26 of the local heating system 200. The local circulation pump 28 is configured to circulate local heat transfer fluid in the local feed and return conduits 22, 23. The local circulation pump 28 is configured to overcome the pressure difference between the local return conduit 23 and the local feed conduit 22. The local circulation pump 28 is further configured to regulate the flow of local heat transfer fluid flowing through the local heat pump 24. By regulating the flow of cooling fluid trough the local heat pump 24, and at the same time optionally control the operation of the local heat pump 24, the temperature of the local heat transfer fluid outputted from the local heat pump 24 may be controlled.

Hence, some or all of the plurality of local heating systems 200 of the local energy distributing system 20 may comprise a local circulation pump 28 for circulating local heat transfer fluid in the local feed and return conduits 22, 23. Additionally or in combination with the plurality of local circulation pumps 28, the local energy distributing system 20 may comprise a central circulation pump 27 configured to circulate the fluid in the local feed and return conduits 22, 23.

The local heat pump 24 may be controlled by a controller 29. The controller 29 may control the local heat pump 24 based on data pertaining to heating demands of the heat emitter 30 and/or data pertaining to the temperature of the local heat transfer fluid in the outlet 26 of the local heat pump 24. Data pertaining to heating demands of the heat emitter 30 may be determined by means of a heat demand sensor 31 connected to the heat emitter 30. Data pertaining to the temperature of the local heat transfer fluid in the outlet 26 of the heat pump 24 may be determined by means of a temperature sensor T1 connected to the outlet 26.

The piping used for the local feed and return conduits 22, 23 in the local energy distributing system 20 is normally plastic un-insulated piping. In this context un-insulated shall be construed such that the piping does not have an extra layer of heat insulating material wrapped around the same. The piping is typically designed for a maximum pressure of 0.6-1MPa. The piping is further typically designed for maximum temperature of about 50° C. Further, the local feed and return conduits 22, 23 in the local energy distributing system 20 may together have a heat transfer coefficient greater than 2.5 W/(mK) when parallel arranged in ground. As mentioned above, this value of the heat transfer coefficient is estimated when the local feed and return conduits are parallel arranged within a distance of one meter from each other in ground having an average annual temperature of 8° C. and the arithmetic average temperature of the local feed and return conduits are 8-10° C.

The local heat transfer fluid, and hence energy carrier, is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto. According to a preferred embodiment the local heat transfer fluid is a mixture of water and an anti-freezing agent, such as glycol. This will allow for the local heat transfer fluid to have temperatures below 0° C. Providing a local heat transfer fluid having freezing point below 0° C., preferably below −5° C., makes it possible to conduct local heat transfer fluid in the return conduit that may absorb heat from the surroundings, e.g. the ground surrounding the return conduit, even if the surroundings have a temperature close to 0° C.

Figure 3:
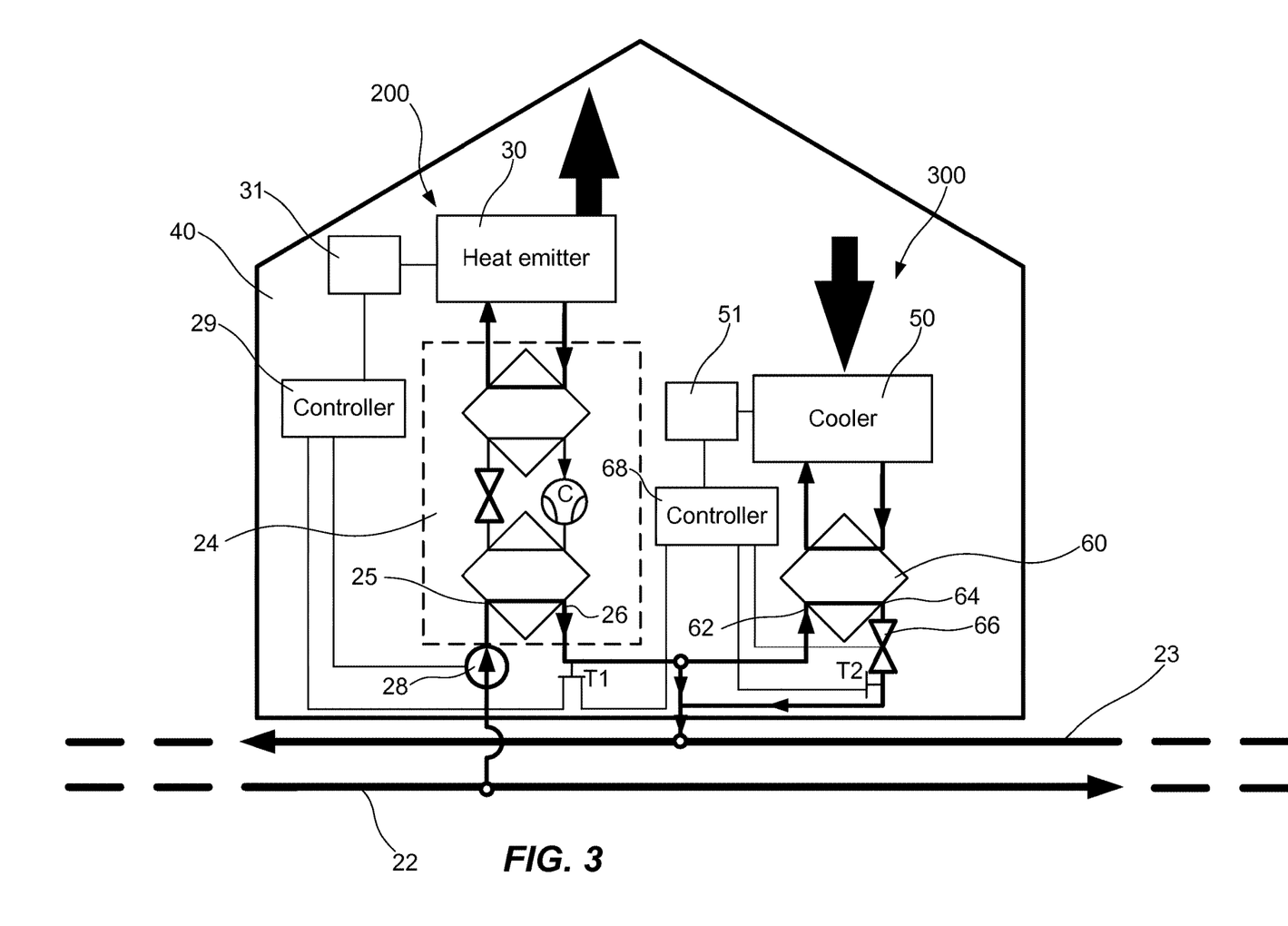
FIG. 3 is a schematic diagram of a combined heating and cooling system.

The local energy distributing system may further comprise one or more local cooling systems 300. With reference to FIG. 2 a local cooling system 300 will be discussed in more detail. It shall be noted that the local cooling system 300 is arranged in connection with a local heating system 200. The local heating system 200 is a local heating system 200 as has been discussed above. In order to avoid undue repetition with regard to the local heating system 200 reference is made to the above.

Each cooling system 300 comprises a cooler 50 and a cooling heat exchanger 60. Coolers 50 are as such well known in the art and may be used e.g. for comfort cooling in buildings such as office buildings, business premises, residential homes and factories in need for cooling. The cooler 50 is connected to the local energy distributing grid 20a via the cooling heat exchanger 60. The local cooling system 300 is configured to, via the cooler 50 and the cooling heat exchanger 60, provide comfort cooling to a respective building 40. Hence, the local cooling system 300 is configured to extract heat from a building 40.

The cooling heat exchanger 60 has an inlet 62 connected to the outlet 26 of one of the plurality of local heating systems 200. The cooling heat exchanger 60 further has an outlet 64 connected to the local return conduit 23 of the local energy distributing grid 20a. In this context the term "inlet of the heat exchanger" is to be interpreted as the inlet via which the heat exchanger is fed with local heat transfer fluid from the local energy distributing grid 20a. Likewise, the term "outlet of the heat exchanger" is to be interpreted as the outlet via which the heat exchanger returns local heat transfer fluid to the local energy distributing grid 20a.

As mentioned above, the cooler 50 is connected to the local energy distributing grid 20a via the cooling heat exchanger 60. With reference to the above, heat exchangers as such are well known in the art and can basically be described as comprising an arrangement of a first closed circuit circulating a first fluid having a first temperature, and a second closed circuit circulating a second fluid having a second temperature. By the two circuits along an extension closely abutting each other a heat transfer takes place between the two fluids. In the local cooling system 300, the first circuit is locally arranged in the building 40 and the second circuit forms part of the local energy distributing grid 20a. Coolers to be used for local cooling systems of buildings are typically situated in air ducts of ventilation or distributed through fan-driven air-coil collectors or ceiling mounted cooling batteries in individual spaces of a building.

The local cooling system 300 may further comprises a flow valve 66. The flow valve 66 is configured to regulate the flow of local heat transfer fluid flowing through the cooling heat exchanger 60. By regulating the flow of local heat transfer fluid trough the cooling heat exchanger 60, and at the same time optionally control the operation of the cooling heat exchanger 60, the temperature of the local heat transfer fluid outputted from the cooling heat exchanger 60 may be controlled. The flow valve 66 may be controlled by a second controller 68. The second controller 68 may control the flow valve 66 based on data pertaining to cooling demands of the cooler 50 and/or data pertaining to the temperature of the local heat transfer fluid in the outlet 26 of the local heating system 200 and/or data pertaining to the temperature of the local heat transfer fluid in the outlet 64 of the local cooling system 300. Data pertaining to cooling demands of the cooler 50 may be determined by means of a cooling demand sensor 51 connected to the cooler 50. Data pertaining to the temperature of the heat transfer fluid in the outlet 26 of the local heating system 200 may be determined by means of the temperature sensor T1 discussed above. Data pertaining to the temperature of the local heat transfer fluid in the outlet 64 of the local cooling system 300 may be determined by means of a temperature sensor T2 connected to the outlet 64.

Figure 4:
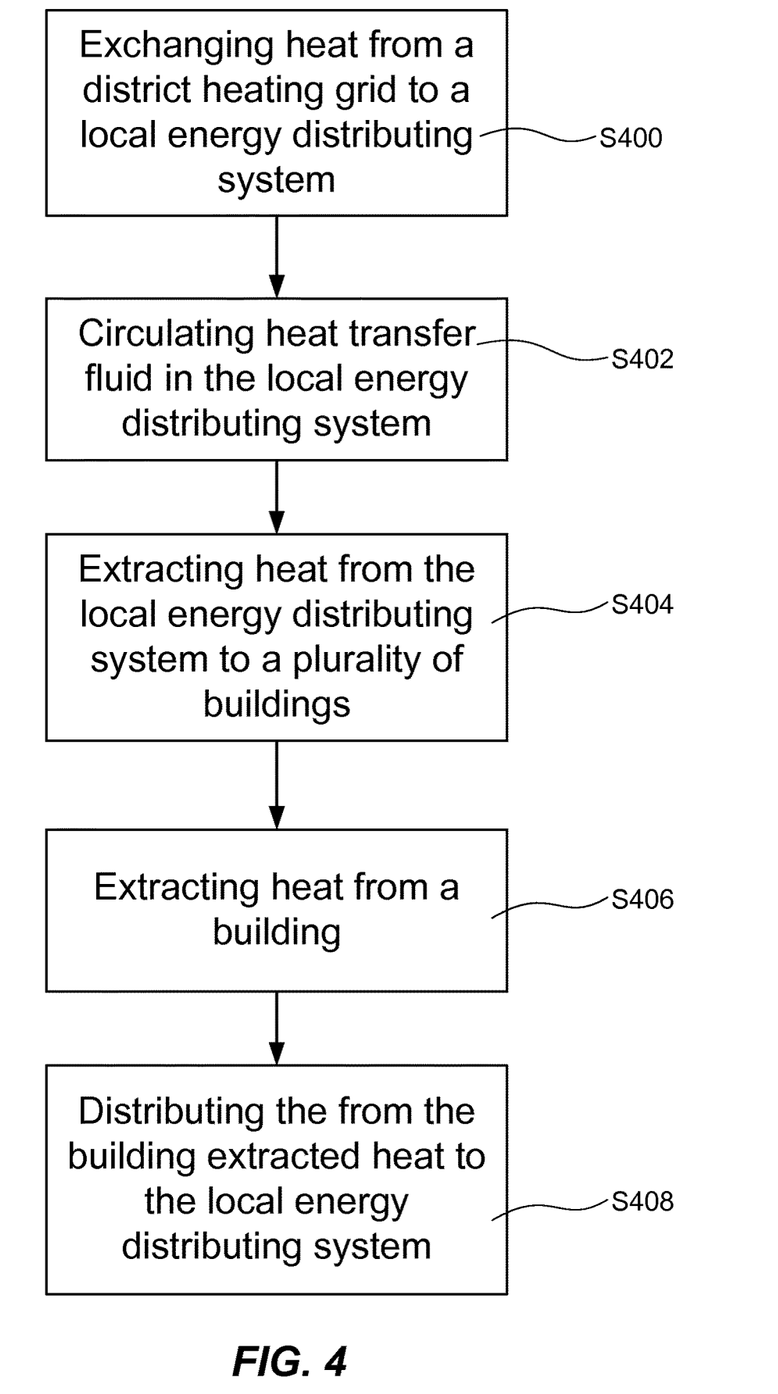
FIG. 4 is a block diagram of a method for distributing energy to a plurality of buildings.

With reference to FIG. 4 a method for distributing energy to a plurality of buildings 40 will be discussed. The method comprises one or more of the following acts. The acts may be performed in any order suitable.

Exchanging S400, at the central heat exchanger 21, heat from the incoming flow of district heat transfer fluid of the district feed conduit 11 in the district heating grid 10 to an outgoing flow of local heat transfer fluid in the local feed conduit 22 of the local energy distributing system 20.

Circulating S402 a flow of local heat transfer fluid in the local energy distributing system 20, the local energy distributing system 20 comprising the local feed conduit 22 configured to distribute local heat transfer fluid from the central heat exchanger 21 and the local return conduit 23 configured to distribute local heat transfer fluid to the central heat exchanger 21. The act of circulating S402 is preferably performed using a plurality the local circulation pumps 28. Alternatively or in combination the act of circulating S404 may be performed using the central circulation pump 27.

Extracting S404, at the local heating system 200 in each of the plurality of buildings 40 heat from the local heat transfer fluid flowing in the local feed conduit 22 for providing hot tap water and/or comfort heating to the respective building 40.

Extracting S406, at a cooling system 300, heat from one of the plurality of buildings 40.

Distributing S408 the from the building 40 extracted heat to the local heat transfer fluid. The heat may be distributed to the local heat transfer fluid of the local return conduit 23. Alternatively or in combination, the heat may be distributed to the local heat transfer fluid of the local feed conduit 22.

The person skilled in the art realizes that the present invention by no means is limited to the preferred embodiments described above. On the contrary, many modifications and variations are possible within the scope of the appended claims.

For example, in the in FIG. 3 shown embodiment the flow valve 66 is arranged in the outlet 64 of the cooling heat exchanger 60. However, the flow valve 66 may alternatively be arranged in the inlet 62 of the cooling heat exchanger 60.

In the in FIG. 3 shown embodiment the first and second controllers 29, 68 are illustrated as separate controllers. However, alternatively the first and second controllers 29, 68 may be combined into a single controller.

Figure 1:
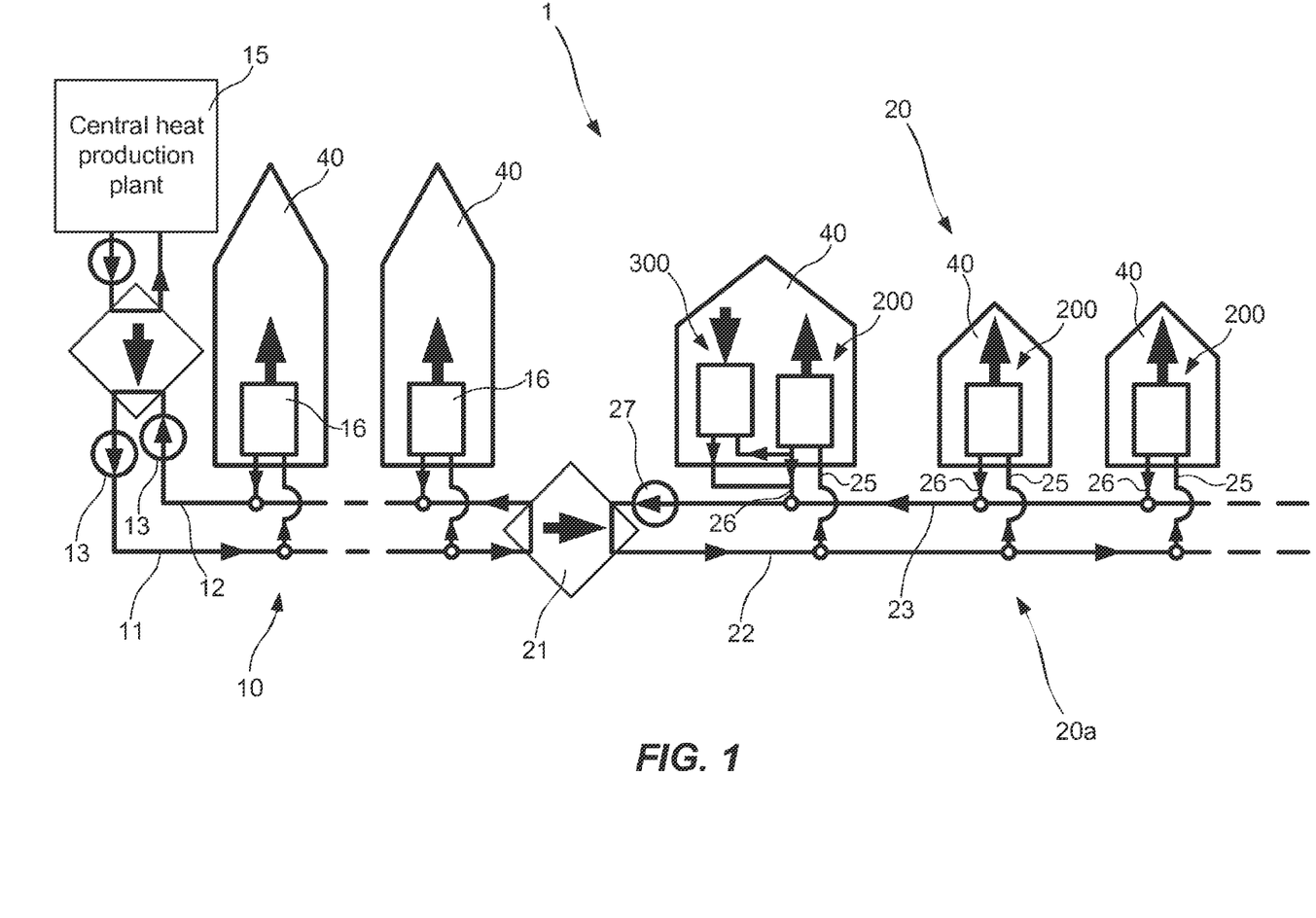
FIG. 1 is a schematic diagram of an energy distribution system.

In the in FIG. 1 shown embodiment the central circulation pump 27 is illustrated to be located at the inlet to the central heat exchanger. However, it is realized that the central circulation pump 27 may be arranged at any position within the local energy distributing grid 20a.

In the in FIG. 3 shown embodiment the local heat transfer fluid exiting the local cooling system 200 via the outlet 64 of the cooling heat exchanger 60 is feed to the local return conduit 23. However, alternatively or in combination, the local heat transfer fluid exiting the local cooling system 200 via the outlet 64 may be feed to the local feed conduit 22. Feeding of the local heat transfer fluid exiting the local cooling system 200 via the outlet 64 may be controlled by the second controller 68. The control of the feeding of the local heat transfer fluid exiting the local cooling system 200 via the outlet 64 to the local feed and/or return conduits 22, 23 may be based on the temperature monitored by the second sensor T2.

Further, the heating and cooling systems have been exemplified with one, respectively two temperature sensors T1 and T1-T2, respectively. It is to be understood that the number of temperature sensors and their positions may change. It is also to be understood that additional sensors may be introduced to the system depending on desired input to the first and second controllers 29, 68 and desired complexity. Especially, the first and second controllers 29, 68 may be arranged to communicate with the heat emitters 30 and/or coolers 50 locally arranged in the buildings 40 to take local settings into account.

Additionally, variations to the disclosed embodiments can be understood and effected by the skilled person in practicing the claimed invention, from a study of the drawings, the disclosure, and the appended claims.

The invention claimed is:

1. A local energy distributing system comprising:
a local feed conduit;
a local return conduit,
wherein the local feed conduit and the local return conduit are along a majority of their extension disposed in ground and each of the local feed conduit and the local return conduit are surrounded by and in direct contact with the ground along the majority of their extension;
a central heat exchanger connected to a district heating grid having a district feed conduit for an incoming flow of district heat transfer fluid having a first temperature in the range of 50-120° C., and a district return conduit for a return flow of district heat transfer fluid, wherein the central heat exchanger is configured to exchange heat from the incoming flow of district heat transfer fluid to an outgoing flow of local heat transfer fluid in the local feed conduit, the outgoing flow of local heat transfer fluid having a temperature of 5-30° C.; and
a plurality of local heating systems, each having an inlet connected to the local feed conduit and an outlet connected to the local return conduit, wherein each local heating system is configured to provide hot water and/or comfort heating to a building,
wherein the local feed conduit together with the local return conduit have a thermal conductivity between them of greater than 2.5 W/(mK) as configured parallel arranged in the ground whereby the local feed conduit, the local return conduit, and the local heat transfer fluid flowing therein absorb thermal energy from the ground surrounding the local feed conduit and the local return conduit such that the local energy distributing system absorbs a portion of the total energy being put into the local energy distributing system from solar energy in the form of thermal energy absorbed from the ground surrounding the local feed conduit and the local return conduit.

2. The local energy distributing system according to claim 1, wherein each of the plurality of local heating systems is configured to extract heat from local heat transfer fluid entering the local heating system via the inlet and return local heat transfer fluid to the local return conduit via the outlet.

3. The local energy distributing system according to claim 2, wherein each of the plurality of local heating systems is configured to return local heat transfer fluid having a temperature being in the range of −5-15° C.

4. The local energy distributing system according to claim 1, wherein at least some of the plurality of local heating systems comprises a local circulation pump connected between the inlet and the outlet of the respective local heating system for circulating local heat transfer fluid in the local feed and return conduits.

5. The local energy distributing system according to claim 1, further comprising a central circulation pump configured to circulate the fluid in the local feed and return conduits.

6. The local energy distributing system according to claim 1, wherein the central heat exchanger is configured to exchange heat such that the district heat transfer fluid returned to the district return conduit is having a temperature of 5-20° C.

7. The local energy distributing system according to claim 1, further comprising one or more local cooling systems having an inlet connected to the outlet of one of the plurality of local heating systems, wherein the one or more local cooling systems are configured to extract heat from a building.

8. The local energy distributing system according to claim 7, wherein the one or more local cooling systems comprises a cooler and a cooling heat exchanger.

9. The local energy distributing system according to claim 1, wherein the central heat exchanger is configured to exchange heat and return the district heat transfer fluid to the district return conduit, the district return conduit including district heat transfer fluid having a temperature of 5-10° C.

10. An energy distributing system comprising:
a district heating grid having a district feed conduit for an incoming flow of district heat transfer fluid having a first temperature in the range of 50-120° C., and a district return conduit for a return flow of district heat transfer fluid; and
a local energy distributing system comprising:
a local feed conduit;
a local return conduit,
wherein the local feed conduit and the local return conduit are along a majority of their extension disposed in ground and each of the local feed conduit and the local return conduit are surrounded by and in direct contact with the ground along the majority of their extension;
a central heat exchanger connected to the district heating grid, wherein the central heat exchanger is configured to exchange heat from the incoming flow of district heat transfer fluid to an outgoing flow of local heat transfer fluid in the local feed conduit, the outgoing flow of local heat transfer fluid having a temperature of 5-30° C.; and
a plurality of local heating systems, each having an inlet connected to the local feed conduit and an outlet connected to the local return conduit, wherein each local heating system is configured to provide hot water and/or comfort heating to a building,
wherein the local feed conduit together with the local return conduit have a thermal conductivity between them of greater than 2.5 W/(mK) as configured parallel arranged in the ground whereby the local feed conduit, the local return conduit, and the local heat transfer fluid flowing therein absorb thermal energy from the ground surrounding the local feed conduit and the local return conduit such that the local energy distributing system absorbs a portion of the total energy being put into the local energy distributing system from solar energy in the form of thermal energy absorbed from the ground surrounding the local feed conduit and the local return conduit.

11. The energy distributing system according to claim 10, further comprising a central heat production plant connected to the district heating grid for providing heat to the district heating grid.

12. The energy distributing system according to claim 10, further comprising a plurality of district heating substations, wherein each district heating substation is configured to provide hot tap water and/or comfort heating to a building.

13. The energy distributing system according to claim 10, wherein each of the plurality of local heating systems is configured to extract heat from local heat transfer fluid entering the local heating system via the inlet and return local heat transfer fluid to the local return conduit via the outlet.

14. The energy distributing system according to claim 10, wherein at least some of the plurality of local heating systems comprises a local circulation pump connected between the inlet and the outlet of the respective local heating system for circulating local heat transfer fluid in the local feed and return conduits.

15. The energy distributing system according to claim 10, further comprising a central circulation pump configured to circulate the fluid in the local feed and return conduits.

16. The energy distributing system according to claim 10, wherein the central heat exchanger is configured to exchange heat such that the district heat transfer fluid returned to the district return conduit is having a temperature of 5-20° C.

17. The energy distributing system according to claim 10, further comprising one or more local cooling systems having an inlet connected to the outlet of one of the plurality of local heating systems, wherein the one or more local cooling systems are configured to extract heat from a building.

18. A method for distributing energy to a plurality of buildings, the method comprising:
   exchanging, at a central heat exchanger, heat from an incoming flow of district heat transfer fluid of a district feed conduit in a district heating grid, the incoming flow of district heat transfer fluid having a first temperature in the range of 50-120° C., to an outgoing flow of local heat transfer fluid in a local feed conduit of a local energy distributing system, the outgoing flow of local heat transfer fluid having a temperature of 5-30° C.; and
   extracting, at a local heating system in each of the plurality of buildings, each local heating system having an inlet connected to the local feed conduit, heat from the local heat transfer fluid flowing in the local feed conduit for providing hot tap water and/or comfort heating to the respective building,
   wherein the local feed conduit together with a local return conduit have a majority of their extension disposed in and in direct contact with ground and have a thermal conductivity greater than 2.5 W/(mK) between them as configured parallel arranged in the ground whereby the local feed conduit, the local return conduit, and the local heat transfer fluid flowing therein absorb thermal energy from the ground surrounding the local feed conduit and the local return conduit such that the local energy distributing system absorbs a portion of the total energy being put into the local energy distributing system from solar energy in the form of thermal energy absorbed from the ground surrounding the local feed conduit and the local return conduit.

19. The method according to claim 18, further comprising circulating a flow of local heat transfer fluid in the local energy distributing system, the local energy distributing system comprising the local feed conduit configured to distribute local heat transfer fluid from the central heat exchanger and a local return conduit configured to distribute local heat transfer fluid to the central heat exchanger.

20. The method according to claim 18, further comprising:
   extracting, at a local cooling system, heat from a building of the plurality of buildings, the local cooling system having an inlet connected to the outlet of one of the plurality of local heating systems; and
   distributing the extracted heat from the building to the local heat transfer fluid.

* * * * *